Aug. 7, 1945.   H. LIEBERHERR   2,381,065
PISTON FOR TWO-STROKE INTERNAL-COMBUSTION ENGINE
Filed Aug. 6, 1943
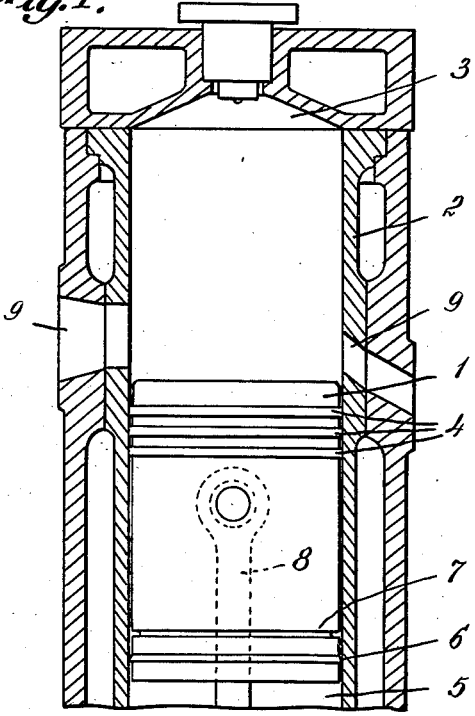
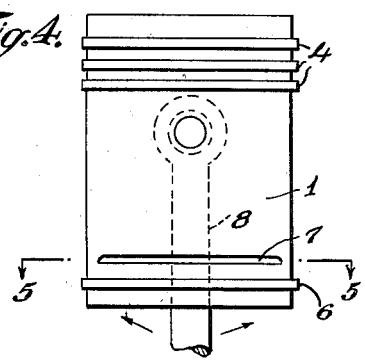
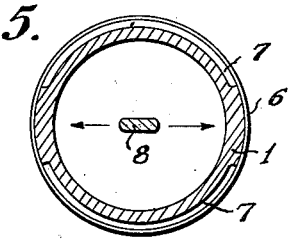
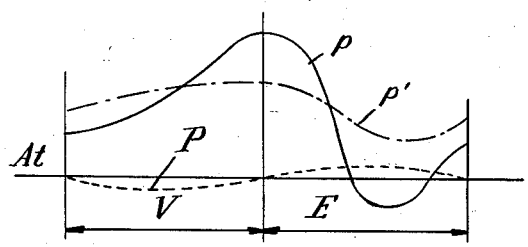
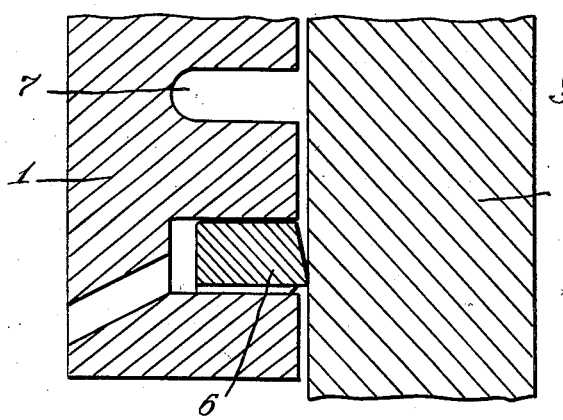
INVENTOR
HANS LIEBERHERR
BY
ATTORNEYS Patented Aug. 7, 1945

2,381,065

UNITED STATES PATENT OFFICE 2,381,065

PISTON FOR TWO-STROKE INTERNAL-COMBUSTION ENGINES

Hans Lieberherr, Winterthur, Switzerland, assignor to Sulzer Freres, Societe Anonyme, Winterthur, Switzerland Application August 6, 1943, Serial No. 497,667
In Switzerland October 24, 1942

2 Claims. (Cl. 123—65)

The invention relates to a piston for two-stroke internal combustion engines which has a space serving as a storage chamber for compressed gases and lying between the piston rings provided near the working space and the oil scraper ring near the crankcase.

Known proposals for the use of such pistons provide an annular space let into the sliding surface or body of the piston and situated near the crown of the piston, this space being designed as an expansion chamber closed and sealed on both sides by means of packing rings and intended to prevent oil from the crankcase making its way into the working space when the pressure in the crankcase is higher than that prevailing in the working space. Such pistons are unsuitable for fitting in two-stroke reciprocating engines because in certain positions of the piston, an undesirable, direct passage of fresh air would take place past the piston itself, from inlet to exhaust, and would thus lead to losses.

The invention is characterised by the fact that the space serving as a storage chamber for compressed gases, and which may be executed in one or more sections, is situated in the piston part which lies near the oil scraper ring and which remains outside the region of the inlet and exhaust ports during the whole stroke of the piston.

The invention is explained in more detail below with the aid of the drawing.

Fig. 1 shows a two-stroke internal combustion engine piston designed in accordance with the invention.

Fig. 2 is the pressure diagram corresponding to this two-stroke engine.

Fig. 3 illustrates on a larger scale the cross-section through the storage space in the piston shown in Fig. 1.

Fig. 4 is the side view of another piston of the invention.

Fig. 5 is a view along line 5—5 of Fig. 4.

The two-stroke internal combustion engine illustrated has a working piston 1 which reciprocates in a cylinder 2. At the end facing the working space 3 of the cylinder the piston 1 is equipped with compression rings 4 and at the end facing the crankcase 5 with the oil scraper ring 6.

It is possible that at the end of the expansion stroke the pressure in the clearance between the piston and the liner is lower than that in the crankcase. As long as the piston moves upwards during the compression stroke V (Fig. 2), the air enclosed in the said clearance is partly driven into the exhaust ports and partly compressed. The changes in pressure then arising are plotted in curve $p$ (Fig. 2). There is then no danger of oil being drawn into the clearance space and into the adjacent working space.

When the piston moves downwards, during the expansion stroke E, the air or combustion gas is not able to flow so quickly through the piston ring joint, so that the pressure $p$ may sink below the atmospheric pressure $At$ and below the pressure $P$ of the crankcase and oil may penetrate into the clearance space and from there into the working space.

To prevent the oil losses described, a space 7 is provided in the sliding surface of piston 1 between the compression rings 4 and the oil scraper ring 6, which space serves as a storage space for compressed gases and is designed in the form of a groove running round the piston. The space or groove 7 running round the piston must be situated at a point in the sliding surface of the piston which remains outside the region of the inlet and exhaust ports 9 during the whole stroke of the piston and which as a consequence lies near the oil scraper ring 6.

It may be expedient to divide the storage space 7 formed by the groove running round the piston into two separate spaces which are placed near the oil scraper ring at points on the sliding surface of the piston which lie on either side of the plane of oscillation of the connecting-rod and which as a consequence are free from, or at any rate only to an insignificant extent subjected to, the normal pressure exerted by the connecting-rod 8. The advantage of this is that those sliding surfaces of the piston which have to support the rather high normal pressures are not broken by a groove that destroys the oil film running along the length of the cylinder and thus impairs the lubrication of the piston.

The volume of the storage spaces may with advantage be chosen somewhat greater than the clearance between the sliding surfaces of cylinder and piston and which is enclosed between the oil scraper ring and the lowest piston ring. As curve $p'$ of Fig. 2 shows when the piston is designed in accordance with the invention, the storage spaces are able to influence the pressure prevailing in the clearance space between piston and liner, in such a way that the pressure never falls below the atmospheric pressure $At$ and the pressure $P$ in the crankcase.

I claim:

1. In an internal combustion engine having inlet and exhaust ports in the cylinder, the combination with the cylinder which comprises a piston having an oil scraper ring near the lower portion thereof, a groove in the exterior wall of the piston running around the piston and spaced a short distance above the oil scraper ring, said groove being so located on the piston that the groove does not reach the said ports during travel of the piston.

2. In an internal combustion engine having inlet and exhaust ports in the cylinder, the combination with the cylinder which comprises a piston having an oil scraper ring near the lower portion thereof, two grooves in the exterior wall of the piston and spaced a short distance above the oil scraper ring, said grooves being located on the sides of the plane of oscillation of the connecting rod and being so located on the piston that the grooves do not reach the said ports during travel of the piston.

HANS LIEBERHERR.